United States Patent
Kerselaers et al.

(10) Patent No.: US 10,812,149 B1
(45) Date of Patent: Oct. 20, 2020

(54) MULTI-MODE NEAR-FIELD DEVICE

(71) Applicant: NXP B.V., Eindhoven (NL)

(72) Inventors: Anthony Kerselaers, Herselt (BE); Liesbeth Gommé, Anderlecht (BE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/744,417

(22) Filed: Jan. 16, 2020

(51) Int. Cl.
H04B 5/00 (2006.01)
H01Q 7/06 (2006.01)
A63F 9/24 (2006.01)

(52) U.S. Cl.
CPC ............ *H04B 5/0081* (2013.01); *A63F 9/24* (2013.01); *H04B 5/0012* (2013.01)

(58) Field of Classification Search
None
See application file for complete search history.

(56) References Cited

U.S. PATENT DOCUMENTS

| | | | |
|---|---|---|---|
| 8,150,319 B2* | 4/2012 | Yoshida | H04B 5/00 455/41.2 |
| 8,457,550 B2* | 6/2013 | Goto | H02J 5/005 455/41.1 |
| 8,970,501 B2 | 3/2015 | Hotelling et al. | |
| 9,154,003 B2* | 10/2015 | Ichikawa | H02J 50/00 |
| 9,262,651 B2* | 2/2016 | Paulsen | G06K 7/0004 |
| 9,407,328 B2* | 8/2016 | Charrat | H04B 5/00 |
| 9,793,961 B2* | 10/2017 | Charrat | G06K 19/07769 |
| 9,948,404 B2* | 4/2018 | Hyoung | H04W 4/80 |
| 10,277,284 B1 | 4/2019 | Kerselaers | |
| 10,347,973 B2* | 7/2019 | Kerselaers | H01Q 1/273 |
| 10,476,552 B2* | 11/2019 | Nekozuka | H01Q 7/06 |
| 10,491,270 B1* | 11/2019 | Kerselaers | H04B 5/0081 |
| 10,566,690 B1* | 2/2020 | Kerselaers | H01Q 7/06 |
| 10,615,502 B2* | 4/2020 | Kerselaers | H04B 5/0012 |
| 10,622,729 B2* | 4/2020 | Geens | H04B 5/0093 |
| 10,644,757 B1* | 5/2020 | Kerselaers | H04B 1/126 |
| 2015/0138597 A1* | 5/2015 | Koshigaya | H04N 1/00132 358/1.15 |
| 2016/0320910 A1 | 11/2016 | Fang et al. | |
| 2019/0089416 A1* | 3/2019 | Nekozuka | G06K 19/0723 |
| 2019/0115952 A1* | 4/2019 | Vallespin | G06K 19/0703 |
| 2019/0132059 A1* | 5/2019 | Tanaka | H04B 13/00 |

OTHER PUBLICATIONS

U.S. Appl. No. 16/150,015; not yet published; 30 pages (Oct. 2, 2018).

U.S. Appl. No. 16/657,165; not yet published; 26 pages (Sep. 11, 2019).

\* cited by examiner

*Primary Examiner* — Tuan A Tran

(57) ABSTRACT

One example discloses a multi-mode near-field device configured to be coupled to a conductive host surface, including: a conductive antenna surface configured as a near-field electrically inductive (NFEI) antenna; wherein the conductive antenna surface includes a first region and a second region; wherein the first region is configured to be capacitively coupled to the conductive host surface; wherein the second region is configured to be galvanically or capacitively coupled to the conductive host surface; wherein the multi-mode device is configured to operate in, a first mode when the second region is galvanically coupled to the conductive host surface; and a second mode when the second region is capacitively coupled to the conductive host surface.

20 Claims, 4 Drawing Sheets

MULTI-MODE NEAR-FIELD DEVICE

The present specification relates to systems, methods, apparatuses, devices, articles of manufacture and instructions for a multi-mode near-field device.

SUMMARY

According to an example embodiment, a multi-mode near-field device configured to be coupled to a conductive host surface, comprising: a conductive antenna surface configured as a near-field electrically inductive (NFEI) antenna; wherein the conductive antenna surface includes a first region and a second region; wherein the first region is configured to be capacitively coupled to the conductive host surface; wherein the second region is configured to be galvanically or capacitively coupled to the conductive host surface; wherein the multi-mode device is configured to operate in, a first mode when the second region is galvanically coupled to the conductive host surface; and a second mode when the second region is capacitively coupled to the conductive host surface.

In another example embodiment, the first mode enables the multi-mode device to increase a received signal strength (RSS) of a near-field communications signal from another near-field device.

In another example embodiment, the second mode enables the multi-mode device to decrease a received signal strength (RSS) of the near-field communications signal from another near-field device.

In another example embodiment, further comprising: a switch having one end directly coupled to the second region of the conductive antenna surface and another end configured to be directly coupled to the conductive host surface.

In another example embodiment, in the first mode the multi-mode device closes the switch.

In another example embodiment, the second mode the multi-mode device opens the switch.

In another example embodiment, further comprising a dielectric layer; wherein one side of the dielectric layer is coupled to the first region of the conductive antenna surface; wherein an opposite side to the one side of the dielectric layer is configured to be in direct contact with the conductive host surface; and wherein the dielectric layer is not coupled to the second region of the conductive antenna surface.

In another example embodiment, the conductive host surface is non-planar.

In another example embodiment, the conductive host surface is or is embedded in at least one of: a finger, an ear, a human body surface, a wearable device, an internet of things device, a biometric device, a building structure, a safe, a pay terminal, an industrial machine, a clinical medical device, a personal health device, a food container, kitchen equipment, a home automation device, a vehicle steering wheel, and/or a vehicle seat or dashboard.

In another example embodiment, the multi-mode near-field device is embedded in at least one of: a game controller, a wearable device, a hearing aid, an earbud, a smartwatch, a smartphone, or a medical monitoring device.

In another example embodiment, further comprising a second conductive antenna surface configured as part of the NFEI antenna.

In another example embodiment, the multi-mode near-field device is configured to receive non-propagating quasi-static electric near-field signals through the conductive antenna surface.

In another example embodiment, further comprising: a coil antenna portion configured as a near-field magnetically inductive (NFMI) antenna.

In another example embodiment, the multi-mode near-field device is configured to receive non-propagating quasi-static magnetic near-field signal through the coil antenna.

In another example embodiment, the multi-mode near-field device is a game controller.

In another example embodiment, the game controller is configured to be in the first mode prior to pairing the game controller with a first user.

In another example embodiment, the game controller is configured to be in the second mode after pairing the game controller with a first user.

In another example embodiment, the game controller is configured to be in a locked state prior to pairing the game controller with a first user.

In another example embodiment, the game controller is configured to be in an unlocked state after pairing the game controller with the first user.

In another example embodiment, the first mode enables the multi-mode device to increase a received signal strength (RSS) of a near-field communications signal from another near-field device; the second mode enables the multi-mode device to decrease a received signal strength (RSS) of the near-field communications signal from the another near-field device; and the another near-field device is another game controller.

The above discussion is not intended to represent every example embodiment or every implementation within the scope of the current or future Claim sets. The Figures and Detailed Description that follow also exemplify various example embodiments.

Various example embodiments may be more completely understood in consideration of the following Detailed Description in connection with the accompanying Drawings.

Figure 1:
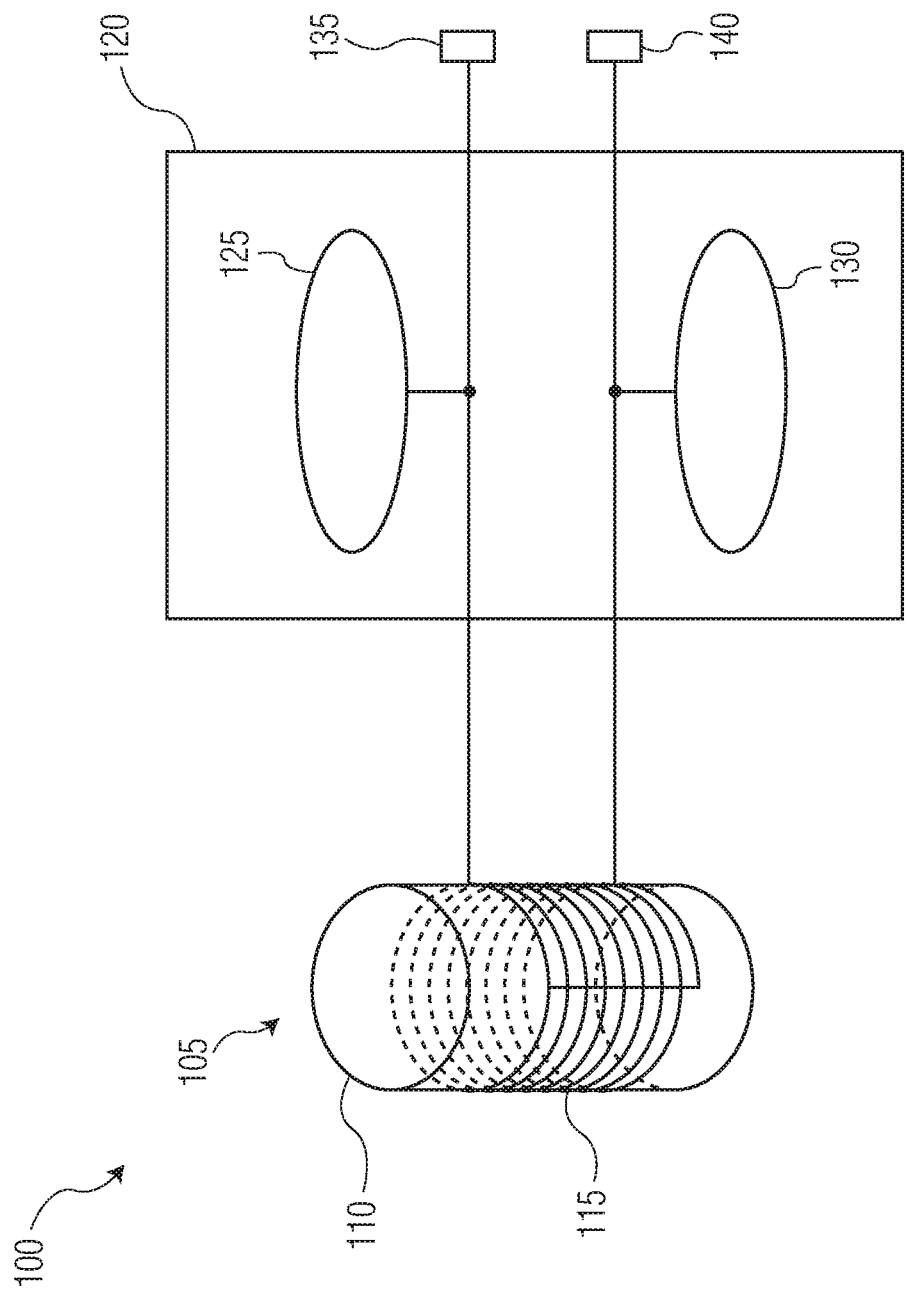
FIG. 1 is an example near-field antenna for use in a wireless device.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Wireless devices in some contexts have particular constraints, such as having a low-cost, require pairing, and trying to communicate is a very electronically noisy environment. For example, many gaming devices have such constraints, especially when more than just a few players are participating.

Each of the gaming devices must be assigned to the player, or a pair of players, and data needs to be communicated with either other players or the gaming console. For example, multiple players can be in a same area and randomly pick-up and use whatever devices are available, and this creates the pairing problem. Some gaming devices are designed to be held in both hands, and this can block inter-device communications. Gamers expect pairing and communications response times in the order of milliseconds or tens of milliseconds so that they can play instantly.

RF technologies, such as Bluetooth, can be used for communications. Such devices operate using far fields in the 2.5 GHz industrial and scientific frequency band, and have a communications range of about 10 meters. However such RF signals broadcast over too large an area for pairing devices with multiple players as they introduce an amount of electronic noise, interference and blocking behavior in a multi-player environment.

Gaming devices designed to be held inside a user's hand will enclose such RF antennas, further degrading the RF signals and any required communications.

Now discussed is a multi-mode near-field device able to both quickly pair and communicate with other wireless devices in an otherwise electronically noisy environment. The multi-mode near-field device uses body communication based on near-field electric induction (NFEI) and near-field electromagnetic induction (NFEMI), where the transmitter and receiver are coupled by just electric (E) fields or both magnetic (H) and electric (E) fields. While RF wireless communication is accomplished by propagating an RF plane wave through free space, NFEI and NFEMI communication utilizes non-propagating quasi-static H and E fields.

An H-field antenna (i.e. magnetic antenna) is primarily sensitive to magnetic fields and/or primarily initiates magnetic fields when driven by a current. Any E-field component from an H-field antenna is strongly reduced (e.g. −20 to −60 dB reduction, a factor of 0.1 to 0.0008 (10% to 0.08%) depending on the antenna design).

A small loop antenna is an example H-field antenna and includes a loop antenna with dimensions much smaller than the wavelength of its use. The small loop antenna does not resonate at the NFEMI carrier frequency but is instead tuned to resonance by an external reactance. In some example embodiments the current in the small loop antenna has in every position of the loop the same value.

An E-field antenna (i.e. electric antenna) is primarily sensitive to electric fields and/or primarily initiates electric fields when driven by a voltage. Any H-field component from an E-field antenna is strongly reduced (e.g. −20 to −60 dB reduction, a factor of 0.1 to 0.0008 (10% to 0.08%) depending on the antenna design).

A short loaded dipole antenna is an example E-field antenna and includes a short dipole with dimensions much smaller than the NFEMI carrier frequency and in some example embodiments has extra capacitance structures at both ends.

The quasi-static characteristic of these fields is a result of the NFEMI antenna dimensions in combination with their carrier frequencies. Most of the near-field energy is stored in the form of magnetic and electric fields, while a small amount of RF energy inevitably propagates in free space.

Near-field magnetic induction (NFMI) communication may also be used for such body communications, however these magnetic fields are not coupled to the body. As a result, these magnetic field devices can be farther away from the body than NFEMI devices and still ensure communication. The NFMI range however is much shorter than a full body due to small antenna sizes in wearable devices.

Small antenna geometries are efficient for NFMI and NFEMI antennas since they minimize radiating waves in free space.

FIG. 1 is an example near-field electromagnetic induction (NFEMI) antenna 100 for use in a wireless device. The antenna 100 in this example is an electromagnetic induction (NFEMI) antenna. In some example embodiments, the antenna 100 includes a coil antenna 105 (i.e. for magnetic fields) in conjunction with a short loaded dipole 120 (i.e. for electric fields). The coil antenna 105 includes a ferrite core 110 wound with wire 115. The short dipole 120 include a first conductive antenna surface 125 and a second conductive antenna surface 130. Antenna 100 feed points 135, 140 are coupled to various transceiver circuitry, such as downstream radio transmitter and receiver integrated circuit (RF-IC), (not shown here). The antenna 100 bandwidth and resonance frequency can be tuned using reactance components (e.g. capacitive and resistive banks) that are integrated in the radio IC.

The short loaded dipole portion 120 is responsive to an electric (E) field. The coil antenna portion 105 is responsive to a magnetic (H) field.

When the NFEMI antenna 100 is proximate to a body (e.g. a person, an object, etc.) the magnetic and electric fields will be substantially confined to the body and not significantly radiate in free-space. This enhances security and privacy of such body networked communications.

In various example embodiments, the antenna 100 operates at or below 50 MHz to ensure that the fields are following the body contours and to ensure that far field radiation is strongly reduced.

Figure 2:
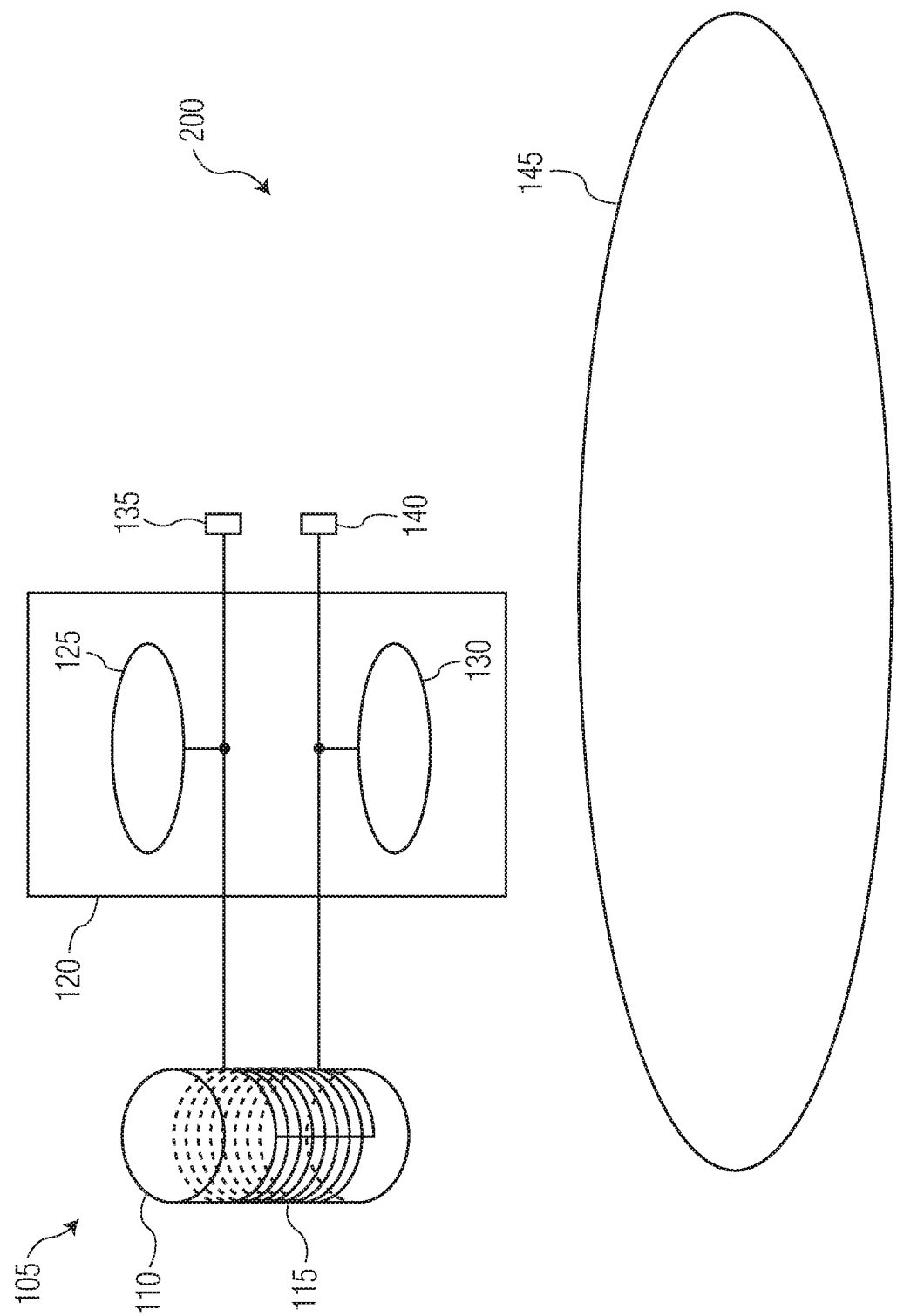
FIG. 2 is an example of the near-field antenna 100 proximate to a conductive host surface.

FIG. 2 is an example 200 of the near-field electromagnetic induction (NFEMI) antenna 100 proximate to a conductive host surface 145. The conductive host surface 145 in various example embodiments can be a human body, a body surface, an ear canal, a nose orifice, a mouth, or a conductive structure of any type.

Near-field signals from the antenna 100 are confined near the conductive host surface 145 in transmit mode, and confined by the conductive host surface 145 in receive mode. In one example embodiment, the near-field frequencies are kept below 50 MHz to ensure that the near-field signals follow the conductive host surface's 145 contours and only a little far field radiation is radiated. The antenna's 100 physical dimensions are much smaller than the antenna's 100 communication wavelength.

The first and second conductive antenna surfaces 125, 130 are positioned close to the conductive host surface 145. In some example embodiments, the second conductive antenna surface 130 is positioned close to the conductive host surface 145 (e.g. the skin of a human body) and the first conductive antenna surface 125 is positioned further away.

In some applications, the NFEMI antenna 100 can be positioned close to the conductive host surface 145 (e.g. an NFEMI antenna 100 in a smartwatch). However, in other applications the NFEMI antenna 100 may be partially or completely covered, such as when in a game controller is placed in a user's hand.

The first conductive surface 125 is somewhat capacitively coupled to the conductive host surface 145. However, the second conductive surface 130 is much more capacitive coupled to the conductive host surface 145 due to its closer proximity. With such positioning of the near-field antenna 100 the electric field will be guided by the conductive host surface 145 and communication is possible across the conductive host surface 145 to another near-field device.

Figure 3:
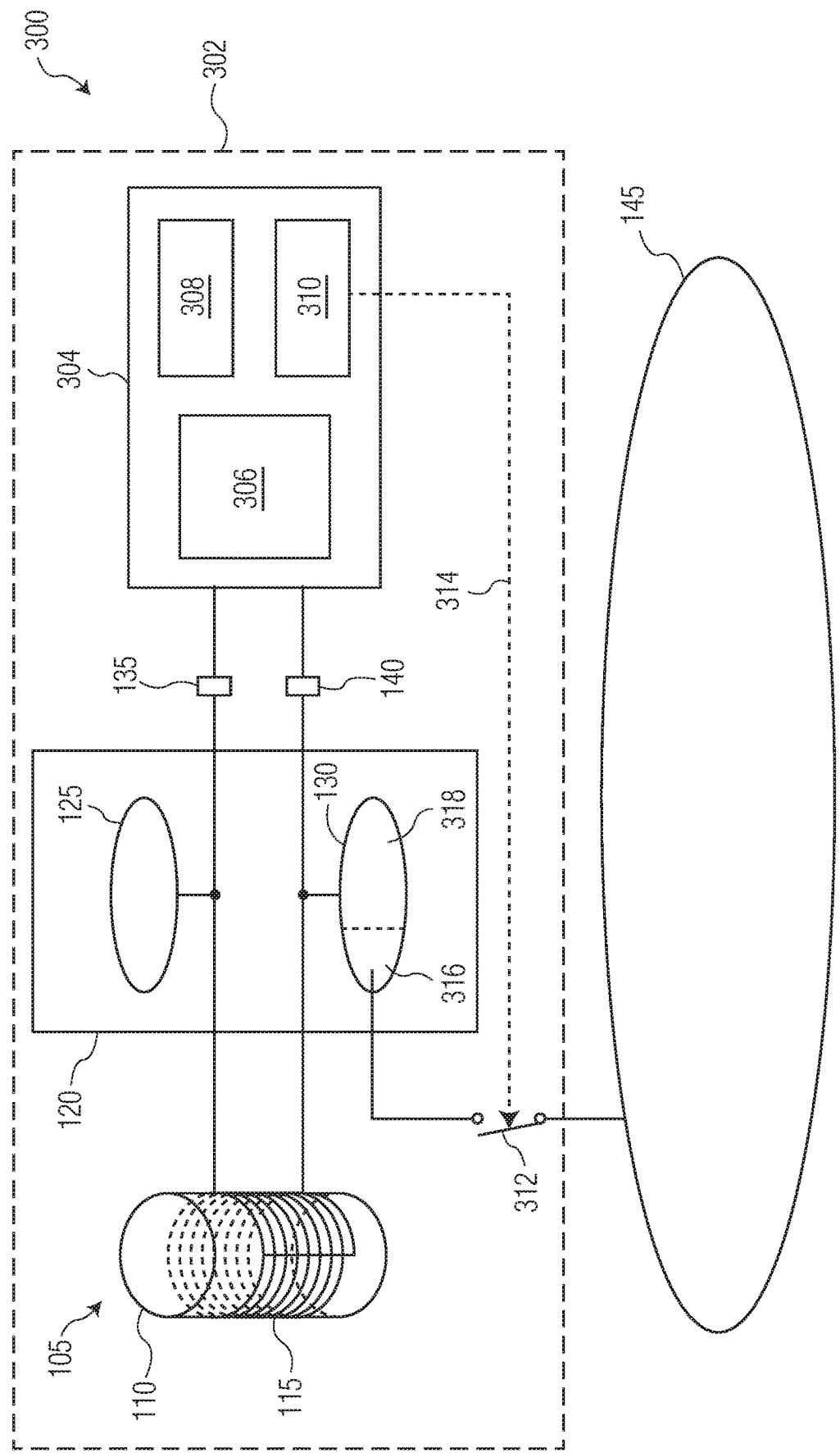
FIG. 3 is an example multi-mode near-field device.

FIG. 3 is an example 300 multi-mode near-field device 302. The multi-mode near-field device 302 includes the near-field antenna 100, a radio integrated circuit (IC) 304, a switch 312 and a control line 314. The radio integrated circuit (IC) 304 includes a tuning circuit 306, a memory 308, and a controller 310. The second conductive antenna surface 130 is divided into a first region 316 and a second region 318. The control line 314 couples the controller 310 to the switch 312. The switch 312 is coupled between the first region 316 of the second conductive antenna surface 130 and the conductive host surface 145.

The multi-mode near-field device 302 has a first configuration mode and a second configuration mode, which thereby varies an efficiency/sensitivity of the near-field antenna's 100 ability to receive communications signals from other near-field devices.

In a first (higher sensitivity) mode, the multi-mode near-field device 302 is configured for a greater communications range by closing the switch 312 and galvanically coupling the electric (E) field antenna 120 to the conductive host surface 145 (e.g. user's body). In this first mode, the galvanic coupling extends the multi-mode device's 302 communications range from cm to meters in some example embodiments.

In a second (lower sensitivity) mode, the multi-mode near-field device 302 is configured for a reduced communications range by opening the switch 312 and capacitively coupling the electric (E) field antenna 120 to the conductive host surface 145, thereby reducing interference from other near-field devices and increasing the privacy of the multi-mode near-field device 302 user.

The switch 312 has several example embodiments. In a first example embodiment, the switch 312 is an exposed portion of the second conductive antenna surface 130 which a user can touch with their finger, for example, to close the switch 312 by creating galvanic contact with the user's body (i.e. the conductive host surface 145).

In a second example embodiment, the switch 312 is coupled at one end to the second conductive antenna surface 130 and at another end to the user's body (i.e. the conductive host surface 145) all the time. The user can then manually close the switch 312 as needed for galvanic contact and leave the switch 312 open otherwise.

In a third example embodiment similar to the second example embodiment, but in which the controller 310 automatically opens and closes the switch 312. Such switching effectively changes a size of the multi-mode near-field device's "communications bubble".

The tuning circuit 306 includes reactance components for setting a resonance frequency and bandwidth of the near-field antenna 100. The memory 308 in example embodiments stores various user identities, operational (e.g. game play) modes, and operational data. The controller 310 controls the overall application of the multi-mode near-field device 302, including in some example embodiments closing and opening the switch 312 using the control line 314.

As introduced above, in the first mode, galvanically connecting the second conductive antenna surface 130 to the conductive host surface 145 by closing the switch 312 increases a received signal strength (RSS) (i.e. Link Budget) from another near-field device to enable robust communications with other wireless devices when necessary. Also in the second mode, opening the switch 312 such that the second conductive antenna surface 130 is capacitively coupled to the conductive host surface 145 decreases the received signal strength (RSS) (i.e. Link Budget) from another near-field device to enable greater privacy and reduce any unwanted noise broadcast to other nearby near-filed devices.

An example equation is, RSS (i.e. Link budget)=$V_{Tx}-V_{Rx}$, where: the Link budget is in dB, $V_{Tx}$ is the voltage at the electric antenna in dBµV, and $V_{Rx}$ is the voltage at the low noise amplifier input of the receiver in dBµV.

Figure 4:
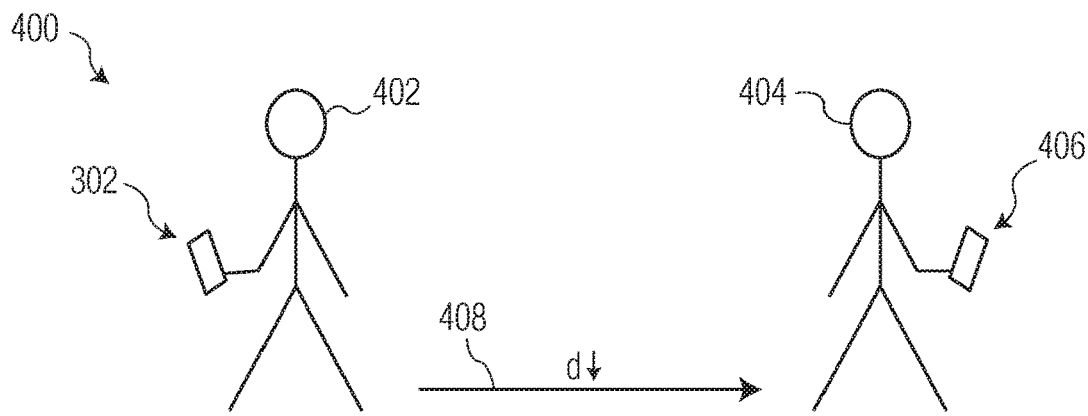
FIG. 4 is an example pictorial diagram depicting a first user holding the multi-mode near-field device and a second user holding another near-field device separated by a distance (d).
Figure 5:
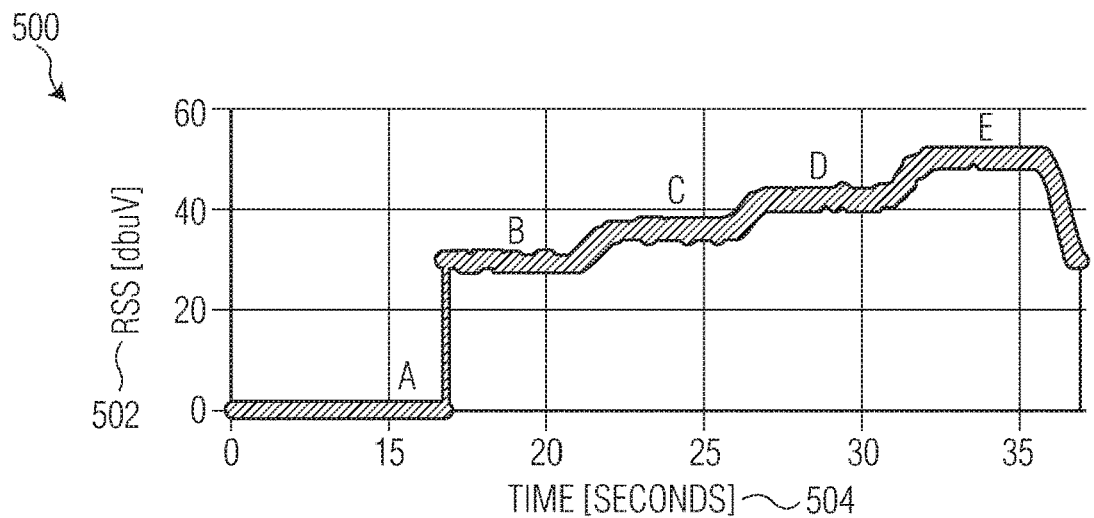
FIG. 5 is an example graph of a received signal strength (RSS) verses time in a second (i.e. capacitive coupling) mode as a first user walks toward a second user (i.e. the distance (d) decreases between the multi-mode near-field device and another near-field device).
Figure 6:
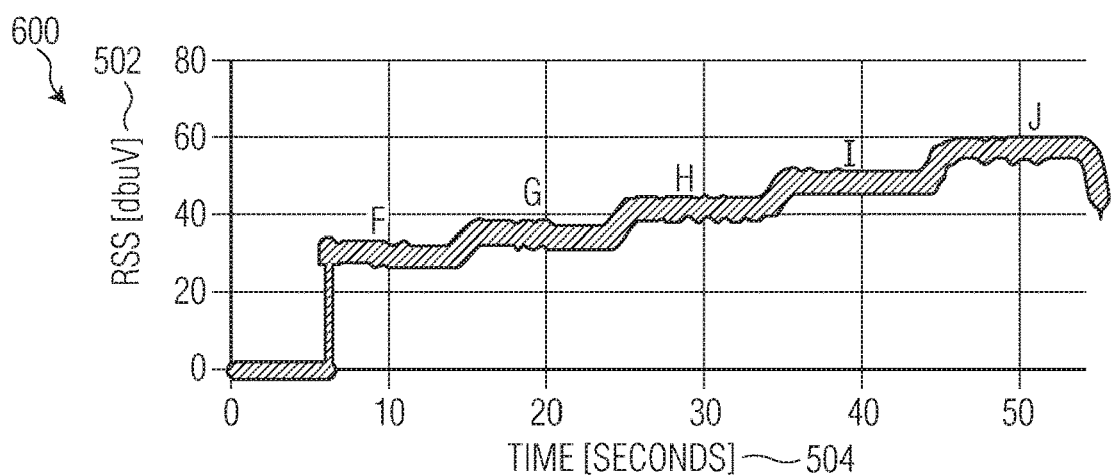
FIG. 6 is an example graph of the received signal strength (RSS) verses time in a first (i.e. galvanic coupling) mode as the first user walks toward the second user (i.e. the distance (d) decreases between the multi-mode near-field device and the another near-field device).

FIG. 4 is an example 400 pictorial diagram depicting a first user 402 holding the multi-mode near-field device 302 and a second user 404 holding another near-field device 406 separated by a distance (d) 408. FIGS. 5 and 6 show example data collected based on the distance (d) 408 between the first user 402 and the second user 404.

FIG. 5 is an example 500 graph of a received signal strength (RSS) 502 versus time 504 in the second (i.e. capacitive coupling) mode as the first user 402 walks toward the second user 404 (i.e. the distance (d) decreases between the multi-mode near-field device and another near-field device).

In this example the second user 404 approaches the first user 402 in 5 sec intervals each corresponding to 20 cm steps.

At segment A: the users are >60 cm apart, there is no communication. At segment B: the users are 60 cm apart the RSS is 30 dBµV. When the users 402, 404 shake hands when 60 cm apart, the RSS is 35 dBµV.

At segment C: the users are 40 cm apart the RSS is 36 dBµV. At segment D: the users are 20 cm apart the RSS is 42 dBµV. At segment E: the users are next to each other (shoulder to shoulder, corresponding arms down), the RSS is 50 dBµV.

FIG. 6 is an example 600 graph of the received signal strength (RSS) 502 versus time 504 in the first (i.e. galvanic coupling) mode as the first user 402 walks toward the second user 404 (i.e. the distance (d) decreases between the multi-mode near-field device and another near-field device).

In this example the second user 404 approaches the first user 402 in 10 sec intervals each corresponding to 20 cm steps.

When the users are >80 cm apart, there is no communication. At segment F: the users are 80 cm apart the RSS is 29 dBµV. At segment G: the users are 60 cm apart the RSS is 35 dBµV. When the users 402, 404 shake hands when 60 cm apart, the RSS is 45 dBµV.

At segment H: the users are 40 cm apart the RSS is 42 dBµV. At segment I: the users are 20 cm apart the RSS is 49 dBµV. At segment J: the users are next to each other (shoulder to shoulder, corresponding arms down), the RSS is 57 dBµV.

These measurements in FIGS. 5 and 6 show that the Link Budget is increased in the first (i.e. galvanic coupling) mode and decreased in the second (i.e. capacitive coupling) mode.

Various instructions and/or operational steps discussed in the above Figures can be executed in any order, unless a specific order is explicitly stated. Also, those skilled in the art will recognize that while some example sets of instructions/steps have been discussed, the material in this specification can be combined in a variety of ways to yield other examples as well, and are to be understood within a context provided by this detailed description.

In some example embodiments these instructions/steps are implemented as functional and software instructions. In other embodiments, the instructions can be implemented either using logic gates, application specific chips, firmware, as well as other hardware forms.

When the instructions are embodied as a set of executable instructions in a non-transitory computer-readable or computer-usable media which are effected on a computer or machine programmed with and controlled by said executable instructions. Said instructions are loaded for execution on a processor (such as one or more CPUs). Said processor includes microprocessors, microcontrollers, processor modules or subsystems (including one or more microprocessors or microcontrollers), or other control or computing devices. A processor can refer to a single component or to plural components. Said computer-readable or computer-usable storage medium or media is (are) considered to be part of an article (or article of manufacture). An article or article of manufacture can refer to any manufactured single component or multiple components. The non-transitory machine or computer-usable media or mediums as defined herein excludes signals, but such media or mediums may be capable of receiving and processing information from signals and/or other transitory mediums.

It will be readily understood that the components of the embodiments as generally described herein and illustrated in the appended figures could be arranged and designed in a wide variety of different configurations. Thus, the detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

What is claimed is:

1. A multi-mode near-field device configured to be coupled to a conductive host surface, comprising:
    a conductive antenna surface configured as a near-field electrically inductive (NFEI) antenna;
    wherein the conductive antenna surface includes a first region and a second region;
    wherein the first region is configured to be capacitively coupled to the conductive host surface;
    wherein the second region is configured to be galvanically or capacitively coupled to the conductive host surface;
    wherein the multi-mode device is configured to operate in,
        a first mode when the second region is galvanically coupled to the conductive host surface; and
        a second mode when the second region is capacitively coupled to the conductive host surface.

2. The device of claim 1:
    wherein the first mode enables the multi-mode device to increase a received signal strength (RSS) of a near-field communications signal from another near-field device.

3. The device of claim 1:
    wherein the second mode enables the multi-mode device to decrease a received signal strength (RSS) of the near-field communications signal from another near-field device.

4. The device of claim 1, further comprising:
    a switch having one end directly coupled to the second region of the conductive antenna surface and another end configured to be directly coupled to the conductive host surface.

5. The device of claim 4:
    wherein in the first mode the multi-mode device closes the switch.

6. The device of claim 4:
    wherein the second mode the multi-mode device opens the switch.

7. The device of claim 1:
    further comprising a dielectric layer;
    wherein one side of the dielectric layer is coupled to the first region of the conductive antenna surface;
    wherein an opposite side to the one side of the dielectric layer is configured to be in direct contact with the conductive host surface; and
    wherein the dielectric layer is not coupled to the second region of the conductive antenna surface.

8. The device of claim 1:
    wherein the conductive host surface is non-planar.

9. The device of claim 1:
    wherein the conductive host surface is or is embedded in at least one of: a finger, an ear, a human body surface, a wearable device, an internet of things device, a biometric device, a building structure, a safe, a pay terminal, an industrial machine, a clinical medical device, a personal health device, a food container, kitchen equipment, a home automation device, a vehicle steering wheel, and/or a vehicle seat or dashboard.

10. The device of claim 1:
wherein the multi-mode near-field device is embedded in at least one of: a game controller, a wearable device, a hearing aid, an earbud, a smartwatch, a smartphone, or a medical monitoring device.

11. The device of claim 1:
further comprising a second conductive antenna surface configured as part of the NFEI antenna.

12. The device of claim 1:
wherein the multi-mode near-field device is configured to receive non-propagating quasi-static electric near-field signals through the conductive antenna surface.

13. The device of claim 1, further comprising:
a coil antenna portion configured as a near-field magnetically inductive (NFMI) antenna.

14. The device of claim 13:
wherein the multi-mode near-field device is configured to receive non-propagating quasi-static magnetic near-field signal through the coil antenna.

15. The device of claim 1:
wherein the multi-mode near-field device is a game controller.

16. The device of claim 15:
wherein the game controller is configured to be in the first mode prior to pairing the game controller with a first user.

17. The device of claim 16:
wherein the game controller is configured to be in the second mode after pairing the game controller with a first user.

18. The device of claim 17:
wherein the game controller is configured to be in a locked state prior to pairing the game controller with a first user.

19. The device of claim 17:
wherein the game controller is configured to be in an unlocked state after pairing the game controller with the first user.

20. The device of claim 15:
wherein the first mode enables the multi-mode device to increase a received signal strength (RSS) of a near-field communications signal from another near-field device;

wherein the second mode enables the multi-mode device to decrease a received signal strength (RSS) of the near-field communications signal from the another near-field device; and wherein the another near-field device is another game controller.

\* \* \* \* \*